(12) United States Patent
Joshi et al.

(10) Patent No.: US 10,683,741 B2
(45) Date of Patent: Jun. 16, 2020

(54) SURFACE-BASED SEPARATION ASSEMBLY FOR USE IN SEPARATING FLUID

(71) Applicant: General Electric Company, Schenectady, NY (US)

(72) Inventors: Mahendra Ladharam Joshi, Katy, TX (US); Catherine James, Oklahoma City, OK (US); Chengbao Wang, Oklahoma City, OK (US); Brian Paul Reeves, Edmond, OK (US); Michael Salerno, Edmond, OK (US); Shyam Sivaramakrishnan, Fremont, CA (US)

(73) Assignee: NextStream Emulsifier Enhancer, LLC, Oklahoma City, OK (US)

( * ) Notice: Subject to any disclaimer, the term of this patent is extended or adjusted under 35 U.S.C. 154(b) by 493 days.

(21) Appl. No.: 15/596,448

(22) Filed: May 16, 2017

(65) Prior Publication Data
US 2018/0334895 A1 Nov. 22, 2018

(51) Int. Cl.
| | |
|---|---|
| E21B 43/34 | (2006.01) |
| B01D 19/00 | (2006.01) |
| B01D 17/02 | (2006.01) |
| C02F 1/38 | (2006.01) |
| C02F 1/20 | (2006.01) |
| C02F 101/32 | (2006.01) |

(52) U.S. Cl.
CPC .......... *E21B 43/34* (2013.01); *B01D 17/0217* (2013.01); *B01D 19/0052* (2013.01); *C02F 1/38* (2013.01); *C02F 1/20* (2013.01); *C02F 2101/32* (2013.01)

(58) Field of Classification Search
None
See application file for complete search history.

(56) References Cited

U.S. PATENT DOCUMENTS

| | | | | |
|---|---|---|---|---|
| 3,641,745 A | * | 2/1972 | Moore | B01D 45/12 55/345 |
| 4,481,020 A | | 11/1984 | Lee et al. | |
| 4,559,068 A | * | 12/1985 | Lagerstedt | B04C 5/103 55/399 |

(Continued)

OTHER PUBLICATIONS

Lobdell, W. R. et al., "The Use of Centrifugal Separators for Offshore Gas Production", Society of Petroleum Engineers of AIME, Houston, Texas, Oct. 6-9, 1974, 8 pp.

*Primary Examiner* — Amber R Orlando
*Assistant Examiner* — Phillip Y Shao
(74) *Attorney, Agent, or Firm* — McAfee & Taft

(57) ABSTRACT

A surface-based separation assembly for use in separating fluid. The surface-based separation assembly includes a gas-liquid separator configured to receive a fluid stream, and configured to separate the fluid stream into a gas stream and a mixed stream of at least two liquids. A liquid-liquid separator is in flow communication with the gas-liquid separator. The liquid-liquid separator is configured to receive the mixed stream from the gas-liquid separator, and is configured to separate the mixed stream into a first liquid stream and a second liquid stream. The assembly further includes a rotatable shaft including a first portion extending through the gas-liquid separator, and a second portion extending through the liquid-liquid separator. The rotatable shaft is configured to induce actuation of the gas-liquid separator and the liquid-liquid separator.

14 Claims, 4 Drawing Sheets

(56) References Cited

U.S. PATENT DOCUMENTS

| | | | |
|---|---|---|---|
| 4,613,349 A | | 9/1986 | Drapp et al. |
| 5,209,765 A | | 5/1993 | Kolpak et al. |
| 5,698,014 A | * | 12/1997 | Cadle ................ B01D 19/0063 |
| | | | 166/357 |
| 6,004,385 A | | 12/1999 | Birmingham |
| 6,033,450 A | * | 3/2000 | Krul ...................... B01D 45/14 |
| | | | 55/345 |
| 6,155,345 A | * | 12/2000 | Lee .................... B01D 19/0052 |
| | | | 166/105.5 |
| 6,251,168 B1 | | 6/2001 | Birmingham et al. |
| 6,821,322 B2 | | 11/2004 | Milia |
| 7,013,978 B2 | | 3/2006 | Appleford et al. |
| 7,462,274 B2 | | 12/2008 | Hamid et al. |
| 8,852,323 B2 | * | 10/2014 | Schook .............. B01D 17/0217 |
| | | | 55/396 |
| 2018/0029048 A1 | * | 2/2018 | Wang ........................ B04C 5/13 |
| 2018/0283154 A1 | * | 10/2018 | De .......................... E21B 43/38 |

\* cited by examiner

SURFACE-BASED SEPARATION ASSEMBLY FOR USE IN SEPARATING FLUID

BACKGROUND

The present disclosure relates generally to oil and gas well separation systems and, more specifically, to a compact surface-based separation assembly.

Hydraulic fracturing, commonly known as fracing, is a technique used to release petroleum, natural gas, and other hydrocarbon-based substances for extraction from underground reservoir rock formations, especially for unconventional reservoirs. The technique includes drilling a wellbore into the rock formations, and pumping a treatment fluid into the wellbore, which causes fractures to form in the rock formations and allows for the release of trapped substances produced from these subterranean natural reservoirs.

At least some known treatment fluids are formed at least partially from water, and the water is sometimes released from the fractures and backflows into the wellbore such that a mixture of water and released hydrocarbon-based substances is formed. The water and hydrocarbon-based substances are then separated from each other such that the hydrocarbon-based substances can be recovered for subsequent refinement. In addition, the water and hydrocarbon-based substances can be separated within the wellbore or at ground level. Separating the produced fluids at ground level, rather than downhole within the wellbore, typically requires larger, more expensive equipment and more energy than separating the produced fluids downhole within the well. Moreover, ground-based separation facilities typically have a low hydraulic efficiency, defined by separated liquid flow as a function of total separator vessel volume, such that the performance of the facility and characteristics of the fluid obtained from the wellbore are difficult to determine in real time.

BRIEF DESCRIPTION

In one aspect, a surface-based separation assembly for use in separating fluid is provided. The surface-based separation assembly includes a gas-liquid separator configured to receive a fluid stream, and configured to separate the fluid stream into a gas stream and a mixed stream of at least two liquids. A liquid-liquid separator is in flow communication with the gas-liquid separator. The liquid-liquid separator is configured to receive the mixed stream from the gas-liquid separator, and is configured to separate the mixed stream into a first liquid stream and a second liquid stream. The assembly further includes a rotatable shaft including a first portion extending through the gas-liquid separator, and a second portion extending through the liquid-liquid separator. The rotatable shaft is configured to induce actuation of the gas-liquid separator and the liquid-liquid separator.

In another aspect, a surface-based separation assembly for use in separating fluid is provided. The surface-based separation assembly includes a rotary gas separator configured to receive a fluid stream, and configured to separate the fluid stream into a gas stream and a mixed stream of at least two liquids. The assembly also includes a centrifugal separator in flow communication with the rotary gas separator. The centrifugal separator is configured to receive the mixed stream from the rotary gas separator, and is configured to separate the mixed stream into a first liquid stream and a second liquid stream.

DRAWINGS

These and other features, aspects, and advantages of the present disclosure will become better understood when the following detailed description is read with reference to the accompanying drawings in which like characters represent like parts throughout the drawings, wherein.

Figure 1:
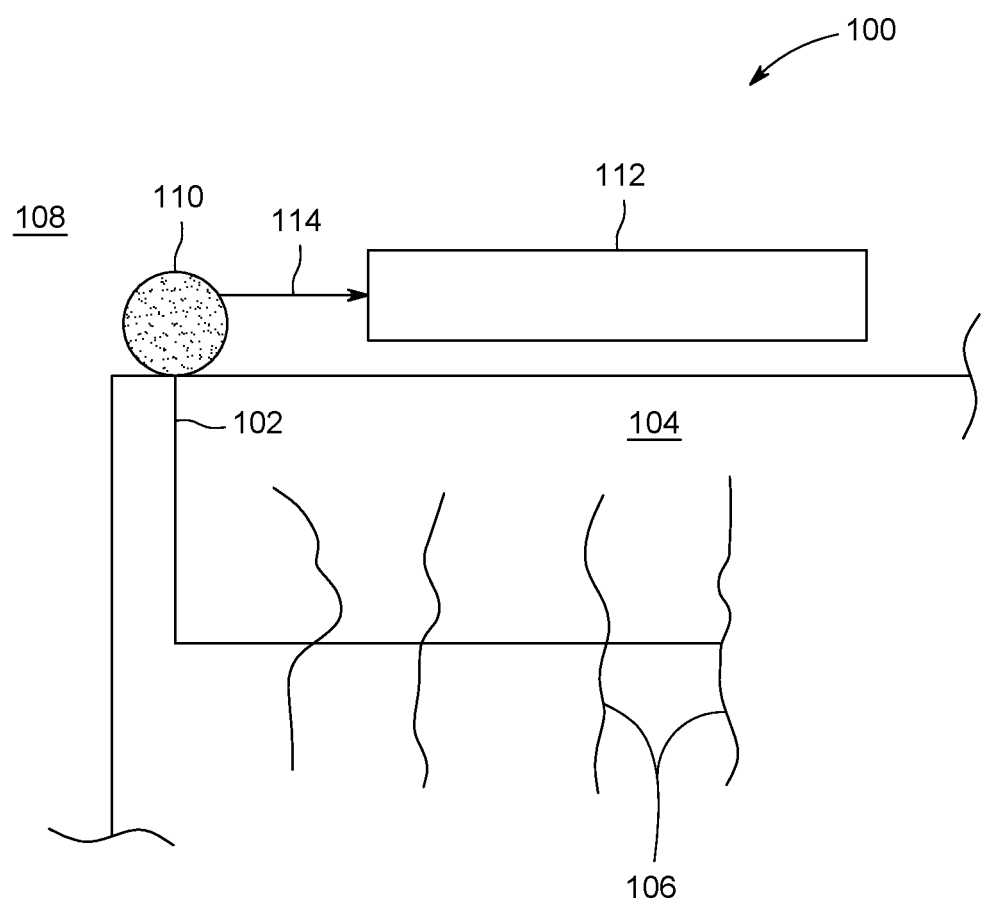
FIG. 1 is a schematic illustration of an exemplary hydraulic fracturing system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

Embodiments of the present disclosure relate to a compact surface-based separation assembly for use in separating fluid extracted from an oil and gas well, and a method of separating fluid extracted from an oil and gas well. More specifically, the surface-based separation assembly includes a gas-liquid separator and a liquid-liquid separator in flow communication with each other such that components of the fluid stream are separated from each other in a staged separation process. In one embodiment, the gas-liquid separator is positioned upstream from the liquid-liquid separator to enhance oil-water separation in the liquid-liquid separator. In addition, the gas-liquid separator and the liquid-liquid separator are integrated on a single shaft that induces actuation of the separator units, such that the surface-based separation assembly is operable in an easy to control and reliable manner. The above-ground staged separation process also facilitates the formation and monitoring of distinct and purified streams of gas, oil, and water discharged from the surface-based separation assembly. The surface-based separation assembly has a hydraulic efficiency, defined by separated liquid flow as a function of total separator vessel volume, of about 100 percent. As such, the performance of the separation assembly and characteristics of the fluid obtained from the wellbore are obtainable in real-time, which enables production optimization and facilitates well choke control for the hydraulic fracturing operation. In addition, the surface-based separation assembly is a flow-through device, which results in a reduced physical footprint and reduced capital cost when compared to facilities implementing gravity-type separator vessels, for example.

As used herein, the terms "axial" and "axially" refer to directions and orientations that extend substantially parallel to a longitudinal axis of the surface-based separation assembly. Moreover, the terms "radial" and "radially" refer to directions and orientations that extend substantially perpendicular to the longitudinal axis of the surface-based separation assembly. In addition, as used herein, the terms "circumferential" and "circumferentially" refer to directions and orientations that extend arcuately about the longitudinal axis of the surface-based separation assembly.

FIG. 1 is a schematic illustration of a hydraulic fracturing system 100 for use in extracting hydrocarbons from a wellbore 102 in a subterranean rock formation 104. More specifically, subterranean rock formation 104 includes at least one fracture 106 extending from wellbore 102. In the exemplary embodiment, hydraulic fracturing system 100 is located on a surface site 108 above subterranean rock formation 104. Hydraulic fracturing system 100 includes a wellhead 110 in flow communication with wellbore 102, and a surface-based separation assembly 112 in flow communication with wellhead 110. In operation, fluid is pumped from wellbore 102, such as with an electrical submersible pump (not shown), and a fluid stream 114 is discharged from wellhead 110 towards surface-based separation assembly 112. As will be explained in more detail below, surface-based separation assembly 112 is operable to separate fluid stream 114 into its component parts.

Figure 2:
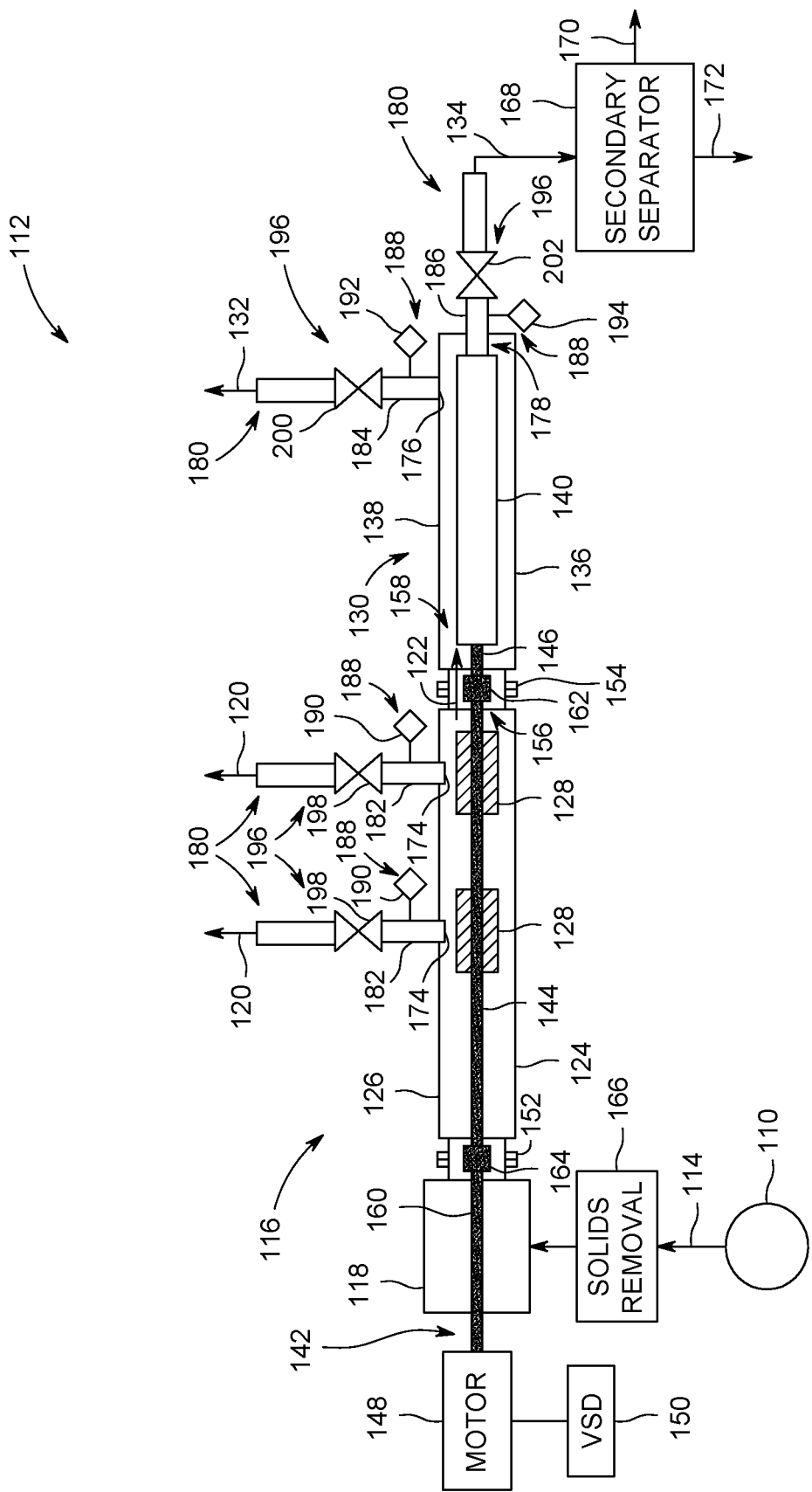
FIG. 2 is a schematic diagram of an exemplary surface-based separation assembly that may be used with the hydraulic fracturing system shown in FIG. 1.

FIG. 2 is a schematic diagram of surface-based separation assembly 112 that may be used with hydraulic fracturing system 100 (shown in FIG. 1). In the exemplary embodiment, surface-based separation assembly 112 includes a gas-liquid separator 116 that receives fluid stream 114 from wellhead 110. More specifically, surface-based separation assembly 112 includes an intake chamber 118 in flow communication with wellhead 110 and gas-liquid separator 116 such that fluid stream 114 is channeled towards gas-liquid separator 116. Gas-liquid separator 116 separates fluid stream 114 into a gas stream 120 and a mixed stream 122 of at least two liquids, and gas stream 120 and mixed stream 122 are then discharged therefrom. In one embodiment, gas-liquid separator 116 is a rotary gas separator 124 having a first cylindrical housing 126 and a pair of impeller stages 128 disposed therein. The pair of impeller stages 128 are rotatable, as will be explained in more detail below, to facilitate forming gas stream 120 and mixed stream 122 from fluid stream 114 channeled therethrough. In an alternative embodiment, rotary gas separator 124 includes any number of impeller stages 128 that enables surface-based separation assembly 112 to function as described herein.

A liquid-liquid separator 130 is in flow communication with gas-liquid separator 116. Liquid-liquid separator 130 receives mixed stream 122 from gas-liquid separator 116 and separates mixed stream 122 into a first liquid stream 132 and a second liquid stream 134. In the exemplary embodiment, first liquid stream 132 is formed primarily from water, and second liquid stream 134 is formed from a mixture of the at least two liquids of mixed stream 122, such as oil and water. In one embodiment, liquid-liquid separator 130 is a centrifugal separator 136 having a second cylindrical housing 138 and a separator chamber 140 disposed therein. Separator chamber 140 is rotatable, as will be explained in more detail below, to facilitate forming first liquid stream 132 and second liquid stream 134 from mixed stream 122 channeled therethrough. In an alternative embodiment, centrifugal separator 136 includes any mechanical assembly capable of centrifugally separating a mixture of liquids based on a density difference therebetween.

In the exemplary embodiment, surface-based separation assembly 112 further includes a rotatable shaft 142 including a first portion 144 extending through gas-liquid separator 116 and a second portion 146 extending through liquid-liquid separator 130. Rotatable shaft 142 induces actuation of gas-liquid separator 116 and of liquid-liquid separator 130. More specifically, rotatable shaft 142 is coupled to the pair of impeller stages 128 and to separator chamber 140 such that gas-liquid separator 116 and liquid-liquid separator 130 are simultaneously operable. For example, surface-based separation assembly 112 further includes a motor 148 coupled to rotatable shaft 142 and a variable speed drive (VSD) 150 coupled to motor 148. Motor 148 provides the driving force for rotatable shaft 142, and motor 148 is controlled by VSD 150. As such, surface-based separation assembly 112 is operable in an easy to control and reliable manner.

In some embodiments, gas-liquid separator 116 and liquid-liquid separator 130 are distinct units and separately formed from each other. As such, a series of couplings are used to join the units of surface-based separation assembly 112 as an integral and unitary structure. For example, intake chamber 118, gas-liquid separator 116, and liquid-liquid separator 130 are coupled together in coaxial alignment relative to rotatable shaft 142. As such, intake chamber 118 and gas-liquid separator 116 are coupled together with a first flange coupling 152, and gas-liquid separator 116 and liquid-liquid separator 130 are coupled together with a second flange coupling 154. First flange coupling 152 and second flange coupling 154 are sealed to facilitate restricting fluid leakage therefrom.

Moreover, as noted above, gas-liquid separator 116 includes first cylindrical housing 126, and liquid-liquid separator 130 includes second cylindrical housing 138. First cylindrical housing 126 has an open end that defines a mixed stream outlet 156 and second cylindrical housing 138 has an open end that defines a mixed stream inlet 158. When gas-liquid separator 116 and liquid-liquid separator 130 are coupled together at second flange coupling 154, mixed stream outlet 156 is in direct flow communication with mixed stream inlet 158. As such, surface-based separation assembly 112 is assembled in a compact manner with a reduced overall footprint.

As noted above, first portion 144 of rotatable shaft 142 extends through gas-liquid separator 116 and second portion 146 of rotatable shaft 142 extends through liquid-liquid separator 130. Moreover, rotatable shaft 142 includes a third portion 160 extending through intake chamber 118 and engaged with motor 148. In the exemplary embodiment, first portion 144 and second portion 146 of rotatable shaft 142 are coupled together with a first coupling 162, and first portion 144 and third portion 160 of rotatable shaft 142 are coupled together with a second coupling 164. As such, an axial flowpath is defined along rotatable shaft 142, and motor 148 is capable of actuating gas-liquid separator 116 and liquid-liquid separator 130 simultaneously. In an alternative embodiment, rotatable shaft 142 is a one-piece unitary structure.

In some embodiments, surface-based separation assembly 112 further includes a solids removal device 166 and a secondary liquid-liquid separator 168 that facilitate separating fluid stream 114 into its component parts. More specifically, solids removal device 166 is in flow communication with gas-liquid separator 116, and is positioned between wellhead 110 and intake chamber 118. Solids removal device 166 facilitates removing particulate matter entrained in fluid stream 114 before channeling fluid stream 114 towards gas-liquid separator 116. An exemplary solids removal device includes, but is not limited to, a hydrocyclone device and a device including a semi-porous filter media.

As noted above, second liquid stream 134 is formed from a mixture of at least two liquids, such as oil and water. In the exemplary embodiment, secondary liquid-liquid separator 168 is in flow communication with, and positioned downstream from, liquid-liquid separator 130. Secondary liquid-liquid separator 168 separates the mixture of the at least two liquids into a first purified liquid stream 170 including primarily water and a second purified liquid stream 172 including primarily oil. As such, the recovery of oil from fluid stream 114 is further enhanced. Example secondary liquid-liquid separators include, but are not limited to a coalescing media separator and a skim tank.

In the exemplary embodiment, gas-liquid separator 116 includes a gas outlet 174 that channels gas stream 120 therethrough, and liquid-liquid separator 130 includes a first liquid outlet 176 that channels first liquid stream 132 therethrough and a second liquid outlet 178 that channels second liquid stream 134 therethrough. The number of gas outlets 174 defined in gas-liquid separator 116 corresponds to the number of impeller stages 128 disposed therein.

In addition, a plurality of fluid lines 180 extend from surface-based separation assembly 112. The plurality of fluid lines 180 includes a first fluid line 182 in flow communication with gas outlet 174, a second fluid line 184 in flow communication with first liquid outlet 176, and a third fluid line 186 in flow communication with second liquid outlet 178. A plurality of flow meters 188 are coupled along the plurality of fluid lines 180. More specifically, the plurality of flow meters 188 includes a first flow meter 190 coupled along first fluid line 182, a second flow meter 192 coupled along second fluid line 184, and a third flow meter 194 coupled along third fluid line 186. The plurality of flow meters 188 are operable to monitor a fluid output of each stream channeled through the plurality of fluid lines 180. As such, fluid output for each component of fluid stream 114 extracted from wellbore 102 (shown in FIG. 1) is determinable on a substantially real-time basis.

In addition, fluid output data may be used to control operation of surface-based separation assembly 112. For example, in the exemplary embodiment, surface-based separation assembly 112 includes a plurality of control valves 196 coupled along the plurality of fluid lines 180. The plurality of control valves 196 includes a first control valve 198 coupled along first fluid line 182, a second control valve 200 coupled along second fluid line 184, and a third control valve 202 coupled along third fluid line 186. The plurality of control valves 196 are operable to restrict fluid flow through the plurality of fluid lines 180 such that a back pressure may be formed therefrom. As such, the plurality of control valves 196 provide selective individual well choke management for each fluid output, which facilitates enhancing well production.

Figure 3:
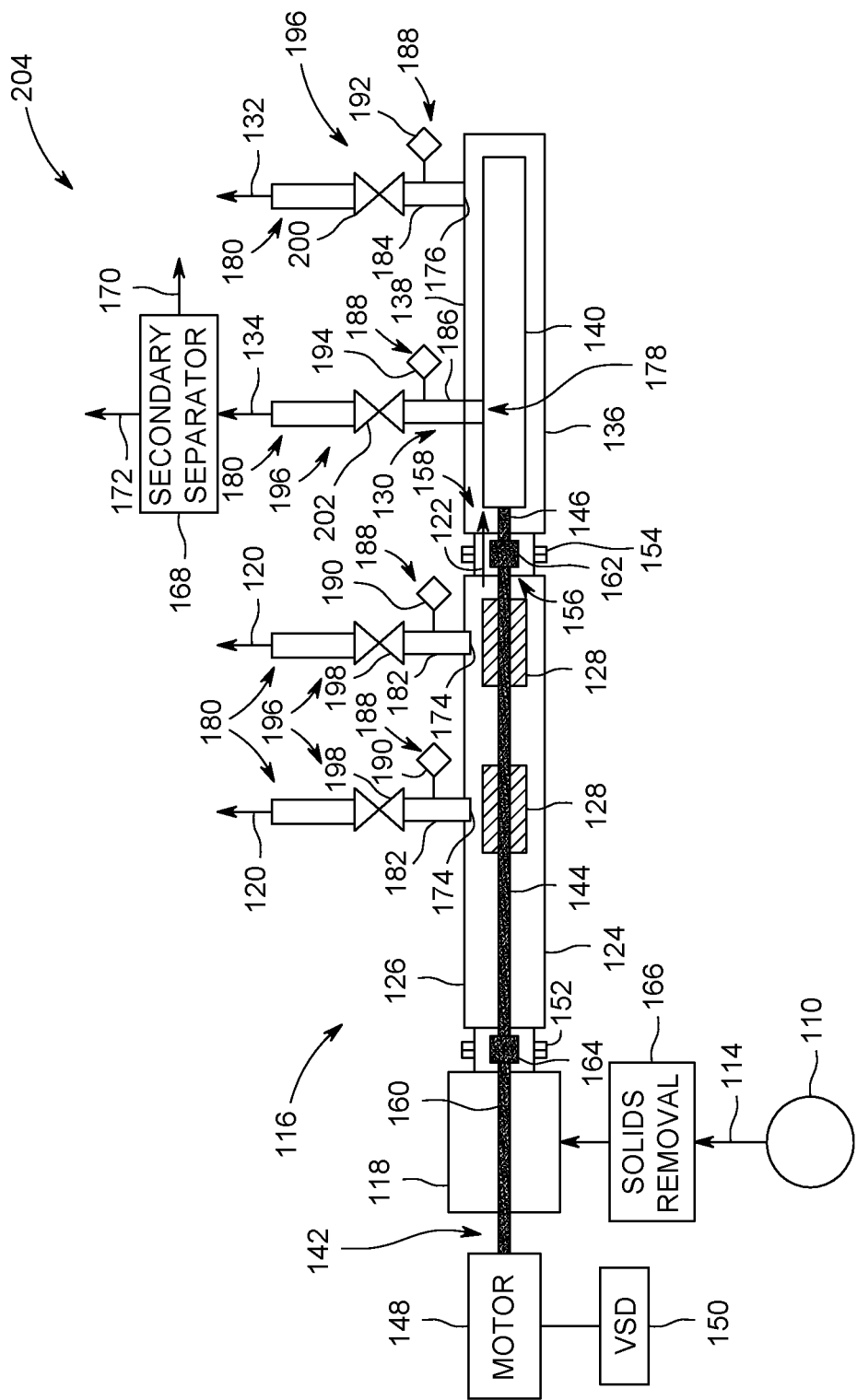
FIG. 3 is a schematic diagram of an alternative surface-based separation assembly that may be used with the hydraulic fracturing system shown in FIG. 1.

FIG. 3 is a schematic diagram of an alternative surface-based separation assembly 204 that may be used with hydraulic fracturing system 100 (shown in FIG. 1). In the exemplary embodiment, surface-based separation assembly 204 includes second liquid outlet 178 positioned upstream from first liquid outlet 176. As noted above, first liquid stream 132 is formed primarily from water, and is discharged from first liquid outlet 176. In the exemplary embodiment, positioning second liquid outlet 178 upstream from first liquid outlet 176 facilitates forming a purified oil stream with less than one percent residual oil. For example, second liquid outlet 178 is positioned upstream from first liquid outlet 176 when mixed stream 122 has an extended water cut defined within a range between about 30 percent and about 99.5 percent. As such, the purified oil stream is formed and secondary separator 168 may be omitted from assembly 204.

Figure 4:
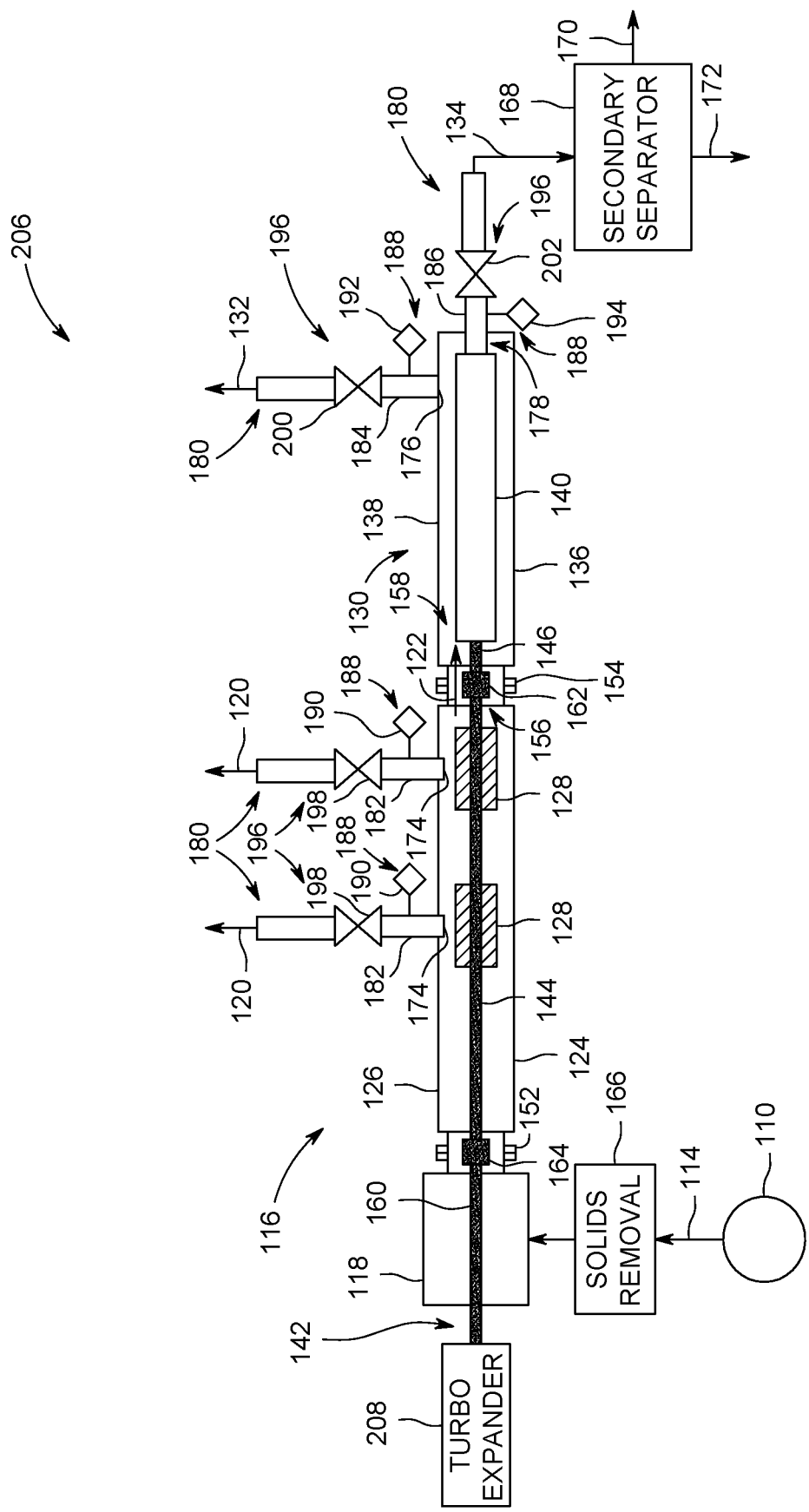
FIG. 4 is a schematic diagram of an alternative surface-based separation assembly that may be used with the hydraulic fracturing system shown in FIG. 1.

FIG. 4 is a schematic diagram of an alternative surface-based separation assembly 206 that may be used with hydraulic fracturing system 100 (shown in FIG. 1). In the exemplary embodiment, assembly 206 includes a turbo-expander 208 that provides the driving force for rotatable shaft 142. More specifically, turbo-expander 208 is coupled to rotatable shaft 142, and is operable based on energy received from fluid discharged from wellhead 110. For example, turbo-expander 208 is configured to convert pressure energy of production fluid, such as fluid discharged from wellhead 110, to rotational energy for powering tuassembly 206. Alternatively, rotatable shaft 142 is rotatable with other drive means such as, but not limited to, an in-line impeller.

An exemplary technical effect of the assembly described herein includes at least one of: (a) separating a mixture including at least two fluids having different densities; (b) providing an above-ground surface-based separation assembly having a reduced physical footprint; and (c) providing an assembly capable of providing real-time well production data and enhanced well production control.

Exemplary embodiments of a surface-based separation assembly and related methods of separating a fluid stream including component parts having different densities are provided herein. The surface-based separation assembly is not limited to the specific embodiments described herein, but rather, components of systems and/or steps of the methods may be utilized independently and separately from other components and/or steps described herein. For example, the configuration of components described herein may also be used in combination with other processes, and is not limited to practice with only separating oil and water mixtures, as described herein. Rather, the exemplary embodiment can be implemented and utilized in connection with many applications where separating a mixture into its component parts is desired.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A surface-based separation assembly for use in separating fluid, said surface-based separation assembly comprising:
   a gas-liquid separator configured to receive a fluid stream, and configured to separate the fluid stream into a gas stream and a mixed stream of at least two liquids;
   a liquid-liquid separator in flow communication with said gas-liquid separator, wherein said liquid-liquid separator is configured to receive the mixed stream from said gas-liquid separator, and is configured to separate the mixed stream into a first liquid stream and a second liquid stream; and
   a rotatable shaft comprising a first portion extending through said gas-liquid separator, and a second portion extending through said liquid-liquid separator, wherein said rotatable shaft is configured to induce actuation of said gas-liquid separator and said liquid-liquid separator.

2. The assembly in accordance with claim 1 further comprising:
   a motor coupled to said rotatable shaft; and
   a variable speed drive coupled to said motor.

3. The assembly in accordance with claim 1, wherein said gas-liquid separator is configured to separate the fluid stream including gas, oil, and water.

4. The assembly in accordance with claim 1, wherein said gas-liquid separator comprises a gas outlet configured to channel the gas stream therethrough, and wherein said liquid-liquid separator comprises a first liquid outlet configured to channel the first liquid stream therethrough and a second liquid outlet configured to channel the second liquid stream therethrough.

5. The assembly in accordance with claim 4, wherein at least one of the first liquid stream or the second liquid stream includes a mixture of the at least two liquids, said assembly further comprising a secondary liquid-liquid separator in flow communication with said liquid-liquid separator, said secondary liquid-liquid separator configured to separate the mixture of the at least two liquids into a first purified liquid stream and a second purified liquid stream.

6. The assembly in accordance with claim 4 further comprising:
   a plurality of fluid lines comprising a first fluid line in flow communication with said gas outlet, a second fluid line in flow communication with said first liquid outlet, and a third fluid line in flow communication with said second liquid outlet; and
   a plurality of flow meters comprising a first flow meter coupled along said first fluid line, a second flow meter coupled along said second fluid line, and a third flow meter coupled along said third fluid line.

7. The assembly in accordance with claim 6 further comprising a plurality of control valves that comprises a first control valve coupled along said first fluid line, a second control valve coupled along said second fluid line, and a third control valve coupled along said third fluid line.

8. The assembly in accordance with claim 1, wherein said gas-liquid separator comprises a first cylindrical housing comprising an open end that defines a mixed stream outlet, wherein said liquid-liquid separator comprises a second cylindrical housing comprising an open end that defines a mixed stream inlet, and wherein said first cylindrical housing and said second cylindrical housing are coupled together such that the mixed stream outlet is in flow communication with said mixed stream inlet.

9. The assembly in accordance with claim 8, wherein said first cylindrical housing and said second cylindrical housing are coupled together with a flange coupling.

10. The assembly in accordance with claim 1, wherein said gas-liquid separator and said liquid-liquid separator are coupled together in coaxial alignment.

11. The assembly in accordance with claim 1 further comprising a turbo-expander coupled to said rotatable shaft, wherein said turbo-expander is configured to convert pressure energy of production fluid to rotational energy for powering the assembly.

12. The assembly in accordance with claim 1 further comprising a solids removal device in flow communication with said gas-liquid separator, wherein said solids removal device is configured to remove particulate matter entrained in the fluid stream that is then received at said gas-liquid separator.

13. The assembly in accordance with claim 1, wherein said gas-liquid separator is a rotary gas separator configured to channel the fluid stream axially therethrough.

14. The assembly in accordance with claim 1, wherein said liquid-liquid separator is a centrifugal separator configured to channel the mixed stream axially therethrough.

* * * * *